(12) United States Patent
Alarcon Hernandez

(10) Patent No.: US 10,000,947 B2
(45) Date of Patent: Jun. 19, 2018

(54) AUTO-LOCK SYSTEM FOR DOOR WINDOW FRAME LATERAL RETENTION

(71) Applicant: FORD GLOBAL TECHNOLOGIES, LLC, Dearborn, MI (US)

(72) Inventor: Jesus Alfonso Alarcon Hernandez, Toluca (MX)

(73) Assignee: Ford Global Technologies LLC, Dearborn, MI (US)

( * ) Notice: Subject to any disclaimer, the term of this patent is extended or adjusted under 35 U.S.C. 154(b) by 30 days.

(21) Appl. No.: 15/052,582

(22) Filed: Feb. 24, 2016

(65) Prior Publication Data

US 2017/0241167 A1 Aug. 24, 2017

(51) Int. Cl.
*E05F 11/00* (2006.01)
*E05B 77/12* (2014.01)
*E05B 83/40* (2014.01)

(52) U.S. Cl.
CPC .............. *E05B 77/12* (2013.01); *E05B 83/40* (2013.01)

(58) Field of Classification Search
CPC ................................ E06B 77/12; E05B 83/40
USPC ................................ 49/360; 296/146.6, 155
See application file for complete search history.

(56) References Cited

U.S. PATENT DOCUMENTS

| 4,915,428 A | | 4/1990 | Hayakawa | |
|---|---|---|---|---|
| 5,626,384 A | * | 5/1997 | Walther | B60J 5/06 296/146.1 |
| 5,791,723 A | * | 8/1998 | Bell | B60J 5/06 16/86 B |
| 5,894,906 A | * | 4/1999 | Weber | E05B 77/12 180/274 |
| 6,206,455 B1 | * | 3/2001 | Faubert | B60J 5/06 16/86 B |
| 6,412,222 B1 | * | 7/2002 | Hashiba | B60J 5/06 296/155 |
| 7,527,321 B1 | * | 5/2009 | Benderoth | B60J 5/0458 296/146.6 |
| 7,699,363 B2 | | 4/2010 | Langfermann et al. | |
| 8,235,453 B2 | * | 8/2012 | Hull, Jr. | E05D 15/10 296/146.9 |

(Continued)

FOREIGN PATENT DOCUMENTS

CN 201068692 Y 6/2008
CN 201554308 U 8/2010

(Continued)

OTHER PUBLICATIONS

English machine traslation of CN201068692Y.

(Continued)

*Primary Examiner* — Jerry E Redman
(74) *Attorney, Agent, or Firm* — Jason Rogers; King & Schickli PLLC

(57) ABSTRACT

A lateral impact retention system for a vehicle door includes a door window frame retainer configured for mounting to the vehicle body and a pivoting catch configured for mounting to a window frame of the door. The pivoting catch engages the retainer when the door is subjected to a door-displacing lateral impact, but is not connected to any door-operating mechanism of the door. During normal operation of the door between the fully closed and open configurations, the pivoting catch automatically inserts into and displaces from the retainer.

16 Claims, 5 Drawing Sheets

(56) References Cited

U.S. PATENT DOCUMENTS

| | | | | |
|---|---|---|---|---|
| 2004/0251693 A1* | 12/2004 | Schoen | ................... | E05B 77/06 |
| | | | | 292/1 |
| 2010/0154308 A1 | 6/2010 | Krishnan et al. | | |
| 2011/0095546 A1* | 4/2011 | Russell | ................... | E05B 77/04 |
| | | | | 292/216 |
| 2011/0308164 A1* | 12/2011 | Terasaki | ............... | B61D 19/026 |
| | | | | 49/360 |
| 2014/0375069 A1* | 12/2014 | Niegeloh | ................ | E05B 85/16 |
| | | | | 292/336.3 |
| 2015/0158503 A1* | 6/2015 | Yamaguchi | .......... | B61D 19/009 |
| | | | | 49/360 |
| 2015/0203162 A1* | 7/2015 | Suzuki | ....................... | B60J 5/02 |
| | | | | 180/274 |
| 2017/0107743 A1* | 4/2017 | Topfer | .................... | E05B 77/06 |
| 2017/0114574 A1* | 4/2017 | Topfer | .................... | E05B 77/06 |
| 2017/0334383 A1* | 11/2017 | Paxton | ................... | B62D 1/197 |

FOREIGN PATENT DOCUMENTS

| | | | | |
|---|---|---|---|---|
| CN | 201802175 U | 4/2011 | | |
| DE | 102007054000 A1 * | 5/2009 | ............... | B60J 5/06 |
| FR | 2292834 A1 | 6/1976 | | |
| JP | 59073326 A * | 4/1984 | ................ | B60J 7/05 |

OTHER PUBLICATIONS

English machine traslation of CN201554308U.
English machine traslation of CN201802175U.
English machine traslation of FR2292834A1.

* cited by examiner

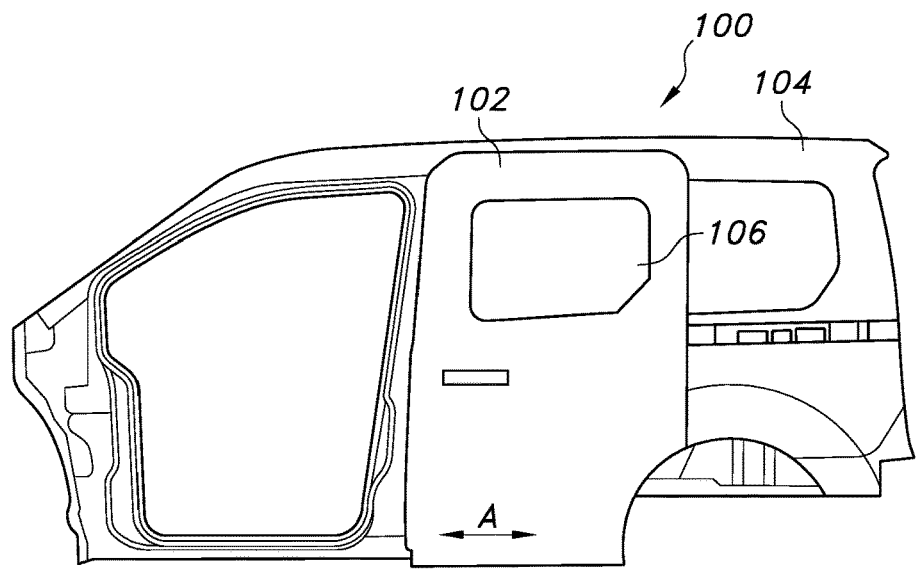
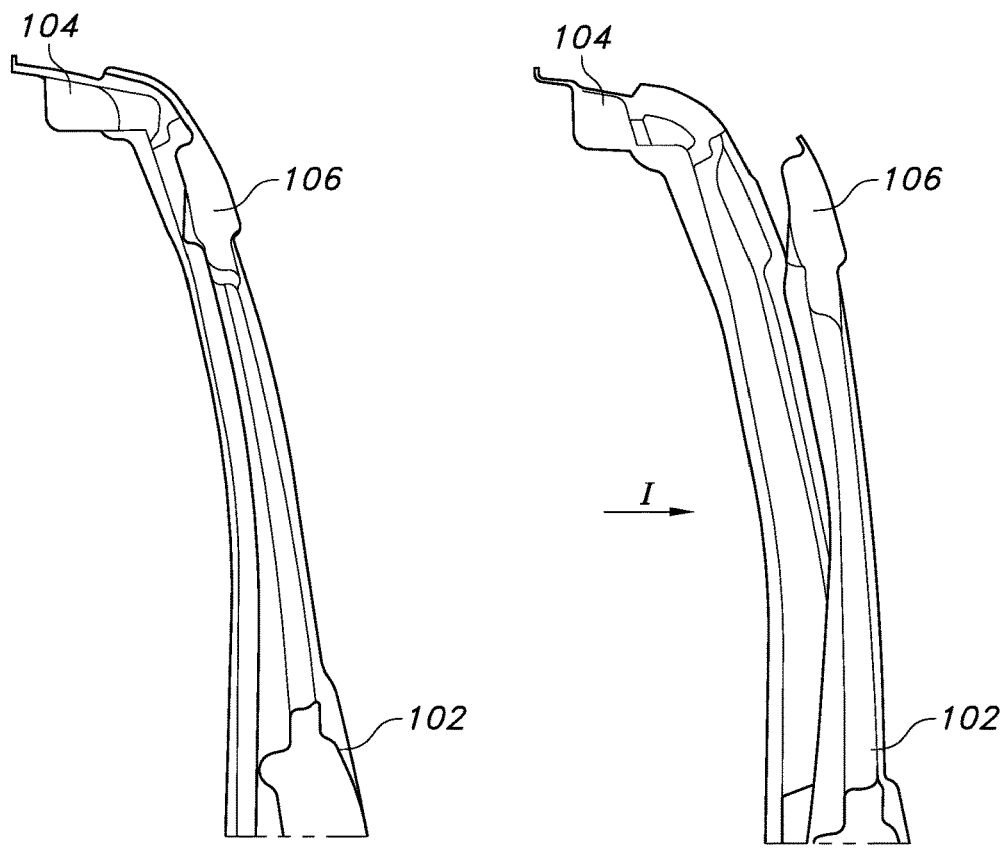
FIG. 1A
FIG. 1B
FIG. 1C

AUTO-LOCK SYSTEM FOR DOOR WINDOW FRAME LATERAL RETENTION

TECHNICAL FIELD

This disclosure relates generally to door retention systems for motor vehicles. More particularly, the disclosure relates to a window frame-mounted lateral retention system for a vehicle door.

BACKGROUND

Ejection mitigation regulations typically require vehicles to pass a test comprising propelling an impactor from an interior of a vehicle towards the vehicle windows. To pass, an ejection mitigation safety system must prevent the impactor from moving past a specified distance beyond a vertical plane defined by the vehicle window. For fixed windows and smaller doors, inclusion of laminated glass in addition to the door structure often suffices to pass an ejection mitigation test.

However, for larger doors such as sliding vehicle doors, the door structure may lack the required structural stiffness and integrity to prevent the impactor from moving beyond the specified distance. Accordingly, there is a need for supplemental ejection mitigation measures to satisfy ejection mitigation requirements for such larger doors.

To satisfy this identified need in the art, the present disclosure relates to an auto-locking lever lock system disposed between the vehicle body and a sliding door window frame. This system provides an additional attachment point between the vehicle body and the sliding door window frame. Advantageously, the disclosed auto-locking lateral impact retention system holds the door to the vehicle body side under a normal load with respect to a plane defined by the door longitudinal and vertical axes. When subjected to a sufficient impactor impact, the auto-locking lateral impact retention system prevents the impactor from displacing the sliding door window frame beyond a specified distance from the vehicle body side.

SUMMARY

In accordance with the purposes and benefits described herein, in one aspect a a lateral impact retention system for a vehicle door is described, comprising a door window frame retainer configured for mounting to the vehicle body and a pivoting catch configured for mounting to a window frame of the door and to engage the retainer when the door is subjected to a door-displacing lateral impact. Advantageously, the operation of the pivoting catch is independent of any door-operating mechanism of the door. In use, the pivoting catch automatically inserts into the retainer when the door is translated to a fully closed position and automatically displaces from the retainer when the door is translated towards an open configuration.

In embodiments, the pivoting catch comprises a retaining flange which engages a cooperating retainer slot when the door is subjected to the door-displacing lateral impact. The pivoting catch may also comprise a cam surface which slidingly displaces the pivoting catch from the retainer when the door is translated towards the open configuration. The retainer may include a cooperating surface which urges the pivoting catch into a recess disposed in the door when the door is translated towards the open configuration. In embodiments, a biasing member urges the pivoting catch outwardly from the recess. In embodiments, the lateral impact retention system is configured for a vehicle sliding door.

In other aspects, vehicles comprising the lateral impact retention system are described.

In the following description, there are shown and described embodiments of the disclosed auto-locking lateral impact retention system. As it should be realized, the device is capable of other, different embodiments and its several details are capable of modification in various, obvious aspects all without departing from the devices and methods as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of the disclosed auto-locking lateral impact retention system, and together with the description serve to explain certain principles thereof. In the drawing:

FIG. 1A depicts a side view of a sliding door assembly for a vehicle body;

FIG. 1B shows a cross-sectional view of the sliding door and vehicle body of FIG. 1A;

FIG. 1C depicts displacement of a window frame portion of the sliding door of FIG. 1A on receiving a lateral impact;

Figure 2:
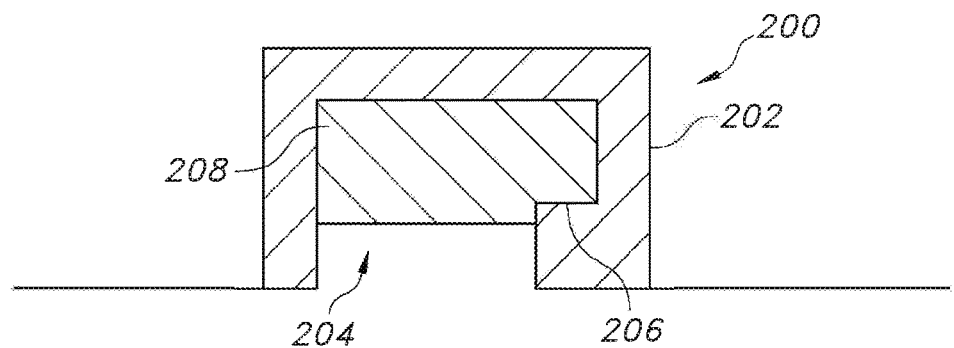
FIG. 2 shows a front cross-sectional view of a vehicle body-mounted retainer for a lateral impact retention system according to the present disclosure.

Reference will now be made in detail to embodiments of the disclosed auto-locking lateral impact retention system, examples of which are illustrated in the accompanying drawing figures.

DETAILED DESCRIPTION

To address the foregoing and other identified problems, the present disclosure describes an auto-locking lateral impact retention system provided by a vehicle body side-mounted retainer and a sliding door-mounted pivoting catch. Advantageously, during normal operation of the vehicle sliding door the pivoting catch automatically inserts into and displaces from the retainer. However, on receiving a suitable lateral impact sufficient to displace the door window frame from the vehicle body side, the pivoting catch engages the retainer to prevent the sliding door from displacing away from the vehicle body side.

In greater detail, as shown in FIG. 1A, during normal use a vehicle 100 sliding door 102 engages a track (not shown) associated with the vehicle body 104, allowing the door to slide along the vehicle x-axis between an open and a closed configuration (see arrows A). During such normal operation, the sliding door 102 and associated window frame 106 remain in alignment with the vehicle body side (FIG. 1B). However, on receiving a sufficient lateral impact from an impactor I, a portion of the door 102 structure may bend and at least the door window frame 106 may displace from the vehicle body side 104 (see FIG. 1C).

To solve this and other problems, the present disclosure describes a lateral impact retention system for a vehicle sliding door. At a high level, the described system includes a vehicle body-mounted retainer and a sliding door-mounted catch which, on receiving a sufficient door-displacing impact, engages the retainer to prevent lateral displacement of the door.

In an embodiment (see FIG. 2), the vehicle body-mounted retainer 200 comprises a body 202 defining an interior receiver 204. One wall of the body 202 defines a ledge or lip 206. Another wall of the body 202 defines a catch-displacing surface 208. As will be described in greater detail below, the interior receiver 204 is dimensioned to receive a portion of a door-mounted catch therein. In use, the vehicle body-mounted retainer body 202 is disposed at least partially recessed into a portion of the vehicle body surface 104.

Figure 3A:
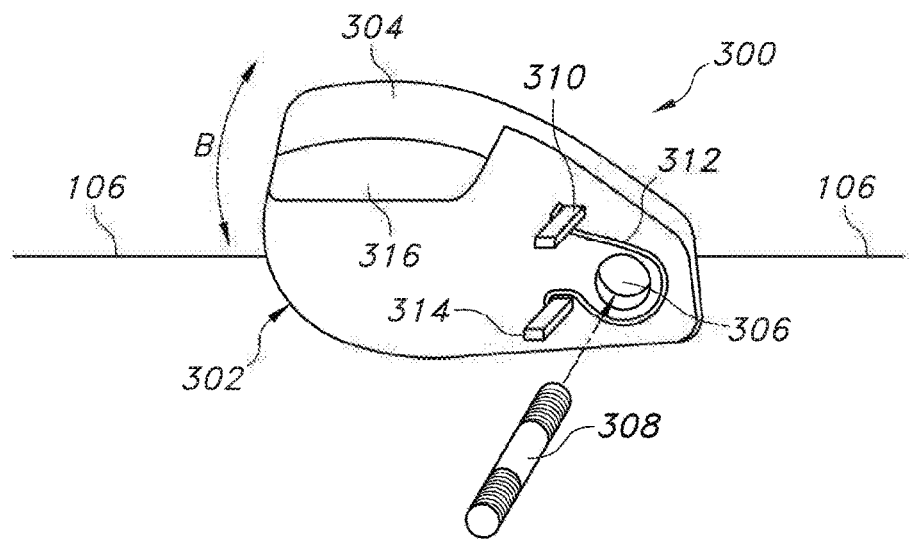
FIG. 3A shows a side view of vehicle sliding door-mounted pivoting catch for a lateral impact retention system according to the present disclosure.
Figure 3B:
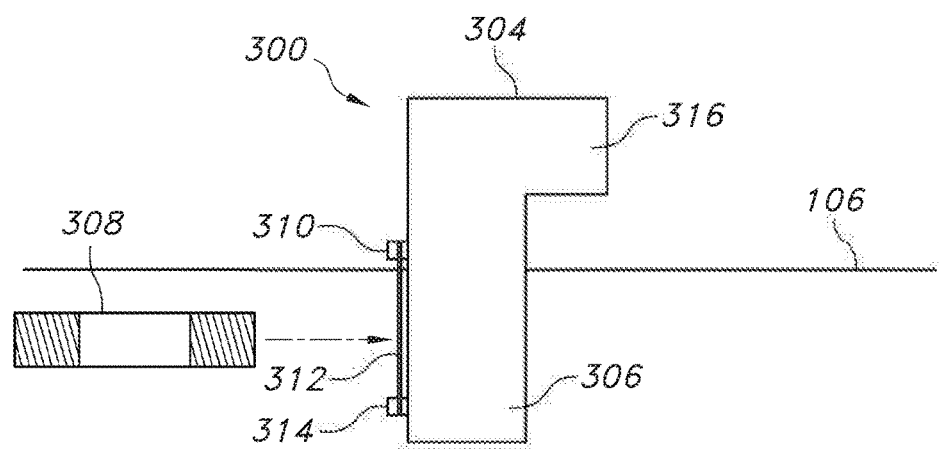
FIG. 3B shows a front cross-sectional view of the pivoting catch of FIG. 3A.

With reference to FIGS. 3A-B, a sliding door-mounted pivoting catch 300 comprises a catch body 302 including at least one cam surface 304. An aperture 306 is provided, dimensioned to receive a pin 308 there-through to allow a pivoting motion of the catch 300. The catch body 302 further includes a stopper 310, to which a biasing member 312 such as a torsion spring, a clock spring, or other suitable biasing member is attached at a first end. The biasing member 312 is attached at an opposed end to a fixed stopper 314 which is in turn attached to a portion of the vehicle sliding door 102 (not shown). By this disposition of the biasing member 312, it will be appreciated that the pivoting catch body 302 is continuously urged upwardly in a vehicle z-axis direction, away from the sliding door window frame 106. However, the catch body 302 can pivot about the fixed axis provided by pin 308 upwardly and downwardly (see arrow B). The catch body 302 further includes or defines a flange 316, configured to engage the door-mounted retainer body interior lip 206 as will be described.

Figure 4:
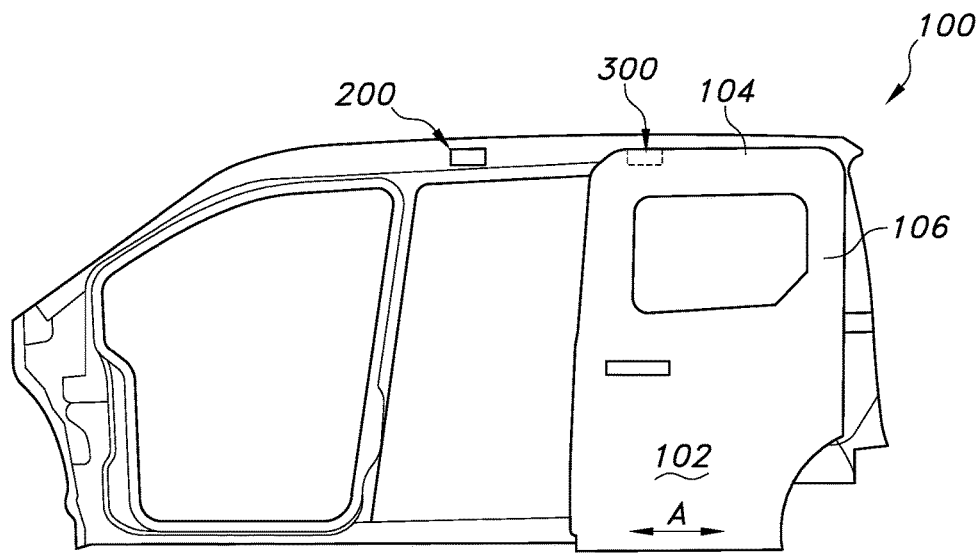
FIG. 4 shows the vehicle body-mounted retainer and door-mounted pivoting catch according to the present disclosure, respectively mounted to a vehicle body and sliding door.

As shown in FIG. 4, the body-mounted retainer 200 is disposed in a portion of the vehicle body 104, and the sliding door-mounted pivoting catch 300 is disposed in a portion of the sliding door window frame 106, in an aligned arrangement whereby the pivoting catch 300 will automatically insert into the body-mounted retainer 200 when the sliding door 102 is translated to a closed configuration (see arrow A).

Figure 5A:
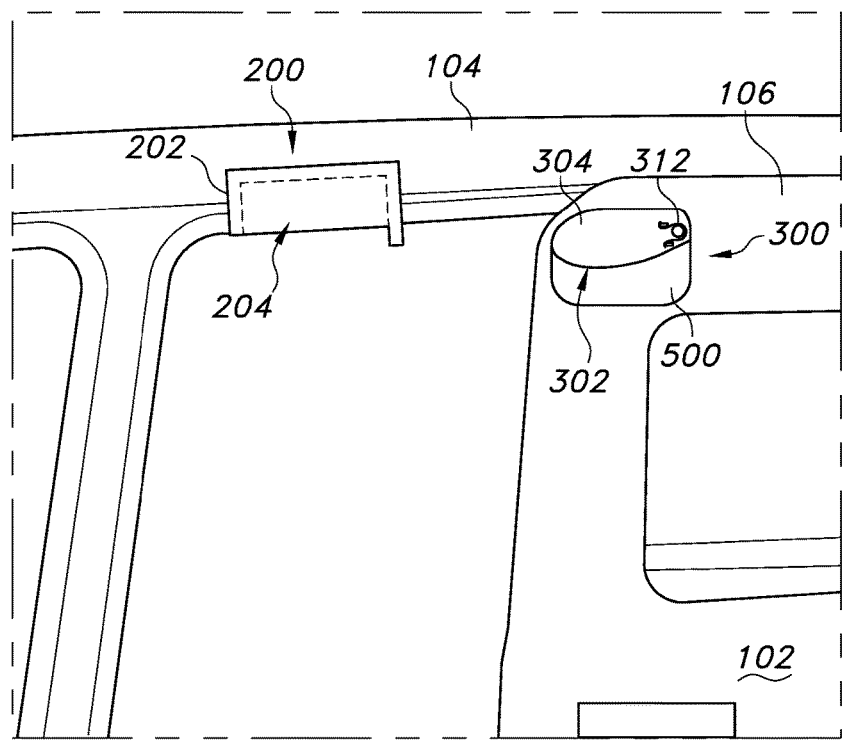
FIG. 5A shows the door-mounted pivoting catch approaching the body-mounted retainer as the sliding door is translated to a fully closed configuration.
Figure 5B:
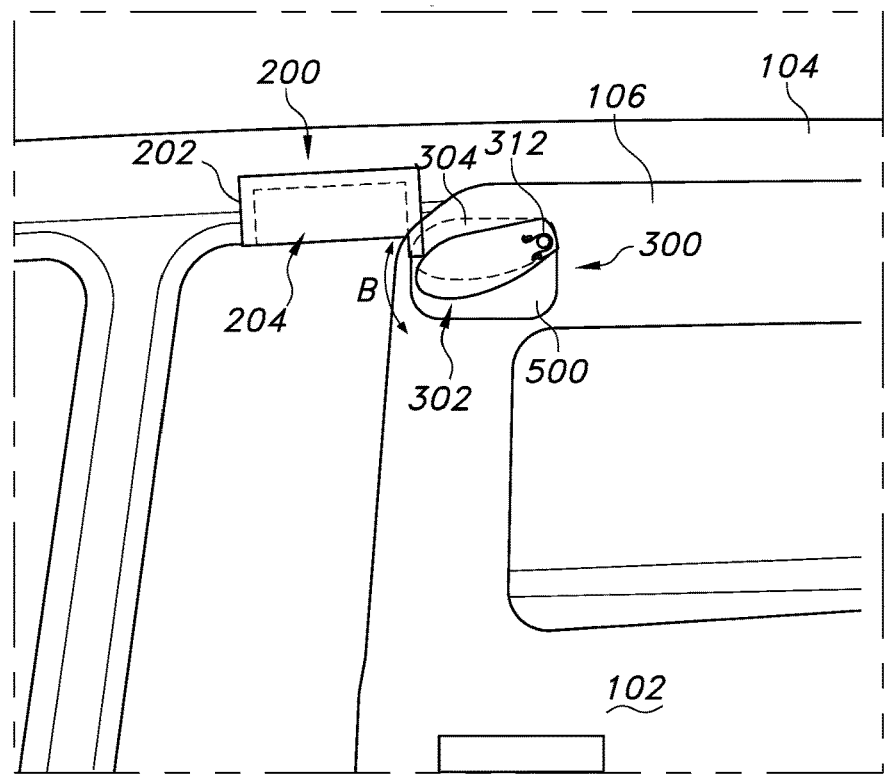
FIG. 5B shows the body-mounted retainer displacing the door-mounted pivoting catch downwardly as the sliding door is translated to the fully closed configuration.
Figure 5C:
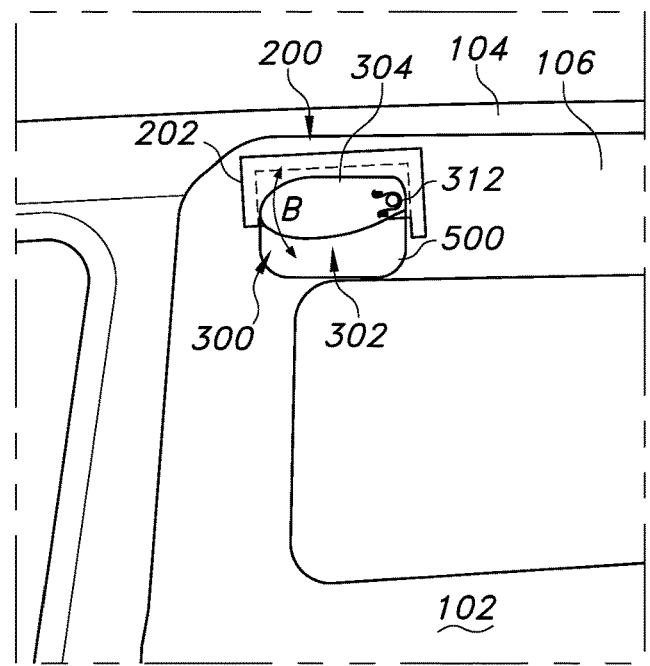
FIG. 5C shows the door-mounted pivoting catch inserted into the body-mounted retainer as the sliding door is translated to the fully closed configuration.

In greater detail, as shown in FIGS. 5A-C as the sliding door 102 is translated to the closed configuration, the door-mounted pivoting catch 300 approaches the vehicle body-mounted receiver 200 (FIG. 5A), and the catch cam surface 304 contacts the retainer catch-displacing surface 208 whereby the pivoting catch 300 is pivoted (arrow B) into a recess 500 defined in the sliding door window frame 106, compressing biasing member 312.

As the sliding door 102 reaches the fully closed configuration (FIG. 5C), biasing member 312 urges the door-mounted pivoting catch 300 to insert into the interior receiver 204. Likewise, as will be appreciated by the skilled artisan, when the sliding door 102 is urged towards the open configuration, the reverse process will occur, i.e. the retainer catch-displacing surface 208 will urge the pivoting catch 300 into the recess 500 by way of cam surface 304. Thus, simply opening and closing the sliding door 102 normally will cause the door-mounted pivoting catch 300 to insert into and displace from the body-mounted retainer 200.

Figure 6A:
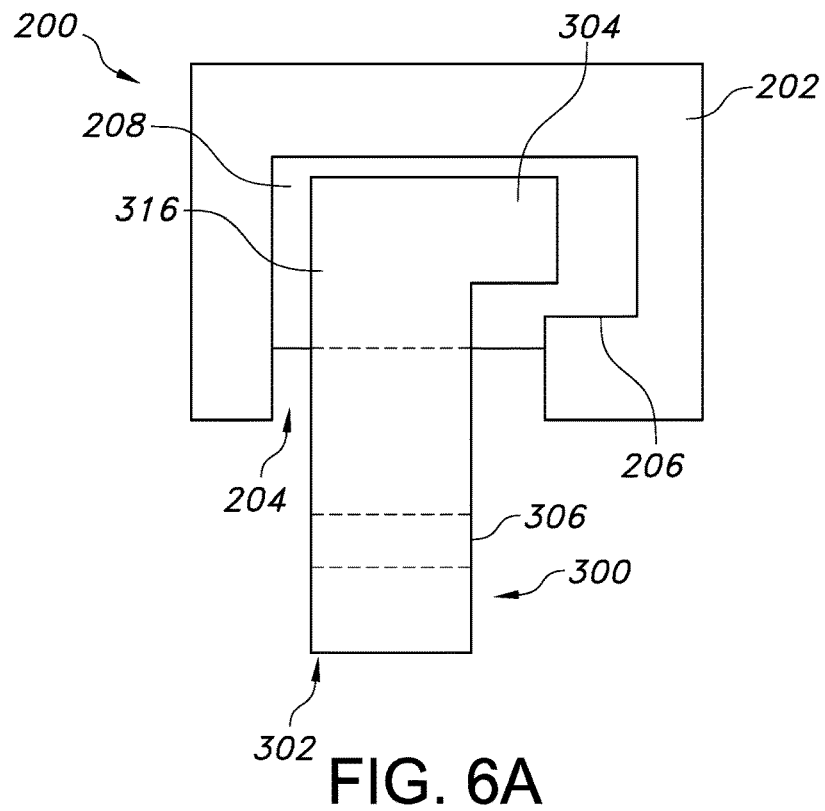
FIG. 6A shows a front cross-sectional view of the door-mounted pivoting catch inserted into the body-mounted retainer as the sliding door prior to a door-displacing lateral impact.
Figure 6B:
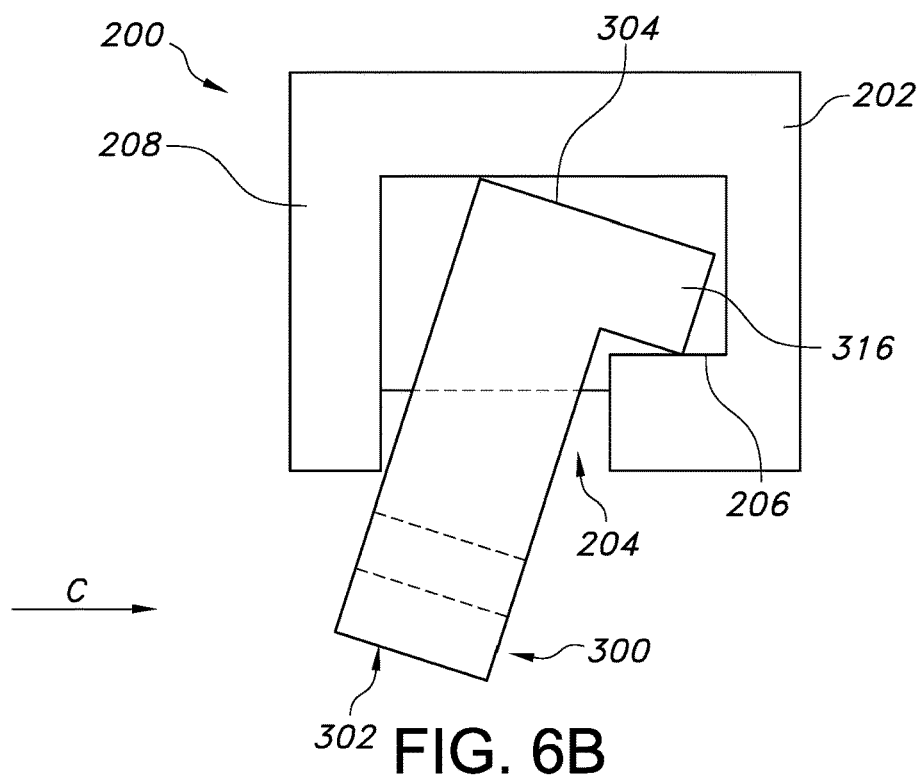
FIG. 6B shows a front cross-sectional view of the door-mounted pivoting catch inserted into the body-mounted retainer as the sliding door after a door-displacing lateral impact.

With reference to FIG. 6A-B, under normal operation door-mounted pivoting catch 300 is inserted into and displaced from the vehicle body-mounted retainer 200 as described above (FIG. 6A). However, on receiving a suitable door-displacing lateral impact (arrow C), as shown in FIG. 6B the flange 316 of pivoting catch 300 engages the body-mounted retainer ledge or lip 206, automatically locking the sliding door in place and preventing full lateral displacement of the sliding door window frame 106.

Accordingly, by the foregoing description a lateral impact retention system for a vehicle sliding door is provided. Advantageously, the described lateral impact retention system for a vehicle sliding door includes a sliding door-mounted catch which automatically engages and releases a vehicle body-mounted retainer, simply by normal opening and closing operations of the sliding door. In turn, the mechanism is uncomplicated, robust, and does not require any element of the sliding door latching, locking, door handle, or other door operating mechanisms for operation.

Obvious modifications and variations are possible in light of the above teachings. For example, the foregoing description primarily describes the lateral impact retention system in the context of a sliding door for a vehicle. However, the skilled artisan will appreciate that the described system is readily adaptable to any vehicle door type, including sliding doors, swing-out doors, gull-wing doors, and others. All such modifications and variations are within the scope of the appended claims when interpreted in accordance with the breadth to which they are fairly, legally and equitably entitled.

What is claimed:

1. A lateral impact retention system for a vehicle door, comprising:
    a door window frame retainer mounted to a vehicle body; and
    a pivoting catch mounted to a window frame of the door and comprising a retaining flange which automatically engages a cooperating slot defined in the door window frame retainer only when the door is subjected to a door-displacing lateral impact;
    wherein the pivoting catch operates independently of any door-actuating mechanism.

2. The system of claim 1, wherein the pivoting catch automatically inserts into the door window frame retainer when the door is translated to a fully closed position and automatically displaces from the retainer when the door is translated towards an open configuration.

3. The system of claim 2, wherein the pivoting catch comprises a cam surface which slidingly displaces the pivoting catch from the door window frame retainer when the door is translated towards the open configuration.

4. The system of claim 2, wherein the door window frame retainer comprises a cooperating surface which urges the pivoting catch into a recess disposed in the door when the door is translated towards the open configuration.

5. The system of claim 4, further comprising a biasing member configured to urge the pivoting catch outwardly from the recess.

6. A vehicle including the system of claim 1.

7. A motor vehicle, comprising;
a body;
at least one vehicle sliding door;
a sliding door window frame retainer mounted to the body; and
a sliding door-mounted pivoting catch comprising a retaining flange which automatically engages a cooperating slot defined in the door window frame retainer only when the sliding door is subjected to a door-displacing lateral impact;
wherein the pivoting catch operates independently of any sliding door actuating mechanism.

8. The motor vehicle of claim 7, wherein the pivoting catch automatically inserts into the door window frame retainer when the sliding door is translated to a fully closed position and automatically displaces from the door window frame retainer when the sliding door is translated towards an open configuration.

9. The motor vehicle of claim 7, wherein the pivoting catch comprises a cam surface which slidingly displaces the pivoting catch from the door window frame retainer when the sliding door is translated towards the open configuration.

10. The motor vehicle of claim 7, wherein the door window frame retainer comprises a cooperating surface which urges the pivoting catch into a recess disposed in the sliding door when the sliding door is translated towards the open configuration.

11. The motor vehicle of claim 10, further comprising a biasing member configured to urge the pivoting catch outwardly from the recess.

12. A lateral impact retention system for a vehicle door, comprising:
a door window frame retainer mounted to a vehicle body; and
a pivoting catch mounted to a window frame of the door and comprising a retaining flange which automatically engages a cooperating slot defined in the door window frame retainer only when the door is subjected to a door-displacing lateral impact;
further wherein the pivoting catch operates independently of any door actuating mechanism, automatically inserts into the door window frame retainer when the door is translated to a fully closed position, and automatically displaces from the door window frame retainer when the door is translated towards an open configuration.

13. The system of claim 12, wherein the pivoting catch comprises a cam surface which slidingly displaces the pivoting catch from the door window frame retainer when the door is translated towards the open configuration.

14. The system of claim 12, wherein the door window frame retainer comprises a cooperating surface which urges the pivoting catch into a recess disposed in the door when the door is translated towards the open configuration.

15. The system of claim 14, further comprising a biasing member configured to urge the pivoting catch outwardly from the recess.

16. A vehicle including the system of claim 12.

* * * * *